United States Patent
Nan

(10) Patent No.: US 7,257,432 B2
(45) Date of Patent: Aug. 14, 2007

(54) MOBILE PHONE

(75) Inventor: Ling-Han Nan, Fengshan (TW)

(73) Assignee: Benq Corporation, Taoyuan (TW)

( * ) Notice: Subject to any disclaimer, the term of this patent is extended or adjusted under 35 U.S.C. 154(b) by 169 days.

(21) Appl. No.: 11/120,527

(22) Filed: May 2, 2005

(65) Prior Publication Data
US 2005/0250563 A1   Nov. 10, 2005

(30) Foreign Application Priority Data
May 5, 2004   (TW) ............................... 93112620 A

(51) Int. Cl.
*H04M 1/00*   (2006.01)
(52) U.S. Cl. ............... 455/575.4; 455/575.1; 455/550.1; 455/90.3; 379/433.12
(58) Field of Classification Search ............ 455/575.4, 455/550.1, 575.1, 90.3; 379/433.12
See application file for complete search history.

(56) References Cited

U.S. PATENT DOCUMENTS 6,040,752 A * 3/2000 Fisher ........................ 335/234
7,084,345 B1 * 8/2006 Chen et al. .................. 174/545
7,162,283 B2 * 1/2007 Bae et al. ................. 455/575.4
2001/0009847 A1 * 7/2001 Kim et al. ..................... 455/90
2004/0157653 A1 * 8/2004 Kato ........................ 455/575.4

FOREIGN PATENT DOCUMENTS

JP   2001-024762   1/2001

* cited by examiner

Primary Examiner—Lester G. Kincaid
Assistant Examiner—Steven Lim
(74) Attorney, Agent, or Firm—Thomas, Kayden, Horstemeyer & Risley

(57) ABSTRACT

A mobile phone. The mobile phone comprises a first housing, a second housing sliding on the first housing, a track disposed on the second housing and having a specific shape and a cam element disposed on the first housing, wherein when the second housing slides on the first housing, the cam element abuts a track to provide at least one stopping position.

12 Claims, 12 Drawing Sheets

MOBILE PHONE

BACKGROUND

The present invention relates to a mobile phone with sliding housings, and in particular to a mobile phone positioning the sliding housings thereof by a cam abutting a track.

Mobile phones with two housings are generally either rotatable with one housing hinged on the other or with one housing slidably disposed on the other. With sliding mobile phones, the housings, by sliding from each other, allow more display space. Japan application publication No. 2001-24762 discloses a mobile phone with two phone housings. One main housing is provided with a display and the other provided with a keypad thereon. The keypad retracts to reveal the display.

However, in this structure, the keypad is fixed in position by friction only, a neither precise nor reliable means, with unexpected sliding possibly interrupting use of the display.

SUMMARY

Embodiments of the invention provide a mobile phone comprising a first housing, a second housing sliding on the first housing, a track disposed on the second housing and having a specific shape and a cam element disposed on the first housing. When the second housing slides on the first housing, the cam element abuts the track, fixing the position thereof.

The first housing has a plane on which the cam element is disposed, and the second housing has another plane facing the first housing plane, to which the track is fixed.

The mobile phone further comprises a bias element disposed on the first housing plane biasing the cam element to abut the track. The bias element can comprise a compression spring, or two magnets aligned with the same polarity, one fixed on the cam element and the other fixed to the first housing. Repellent force between the magnets, oppositely disposed, abuts the cam element to the track.

The track has at least one portion curved in a first direction parallel to the second housing plane and opposite the bias of the bias element. The track has hooked ends to prevent the cam element from escaping therefrom.

The first housing further has a slot formed on the first housing plane accommodating the cam element and the bias element. The cam element includes a finger abutting the track and a base portion sliding in the slot and contacting the bias element. The finger and the base portion are integrally formed and configured in a T shape. The slot has a notch defined through which the finger extends, to abut the track.

The first housing has a groove and the second housing has a flange seating therein to enable the second housing to slide on the first housing.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

First Embodiment

Figure 1:
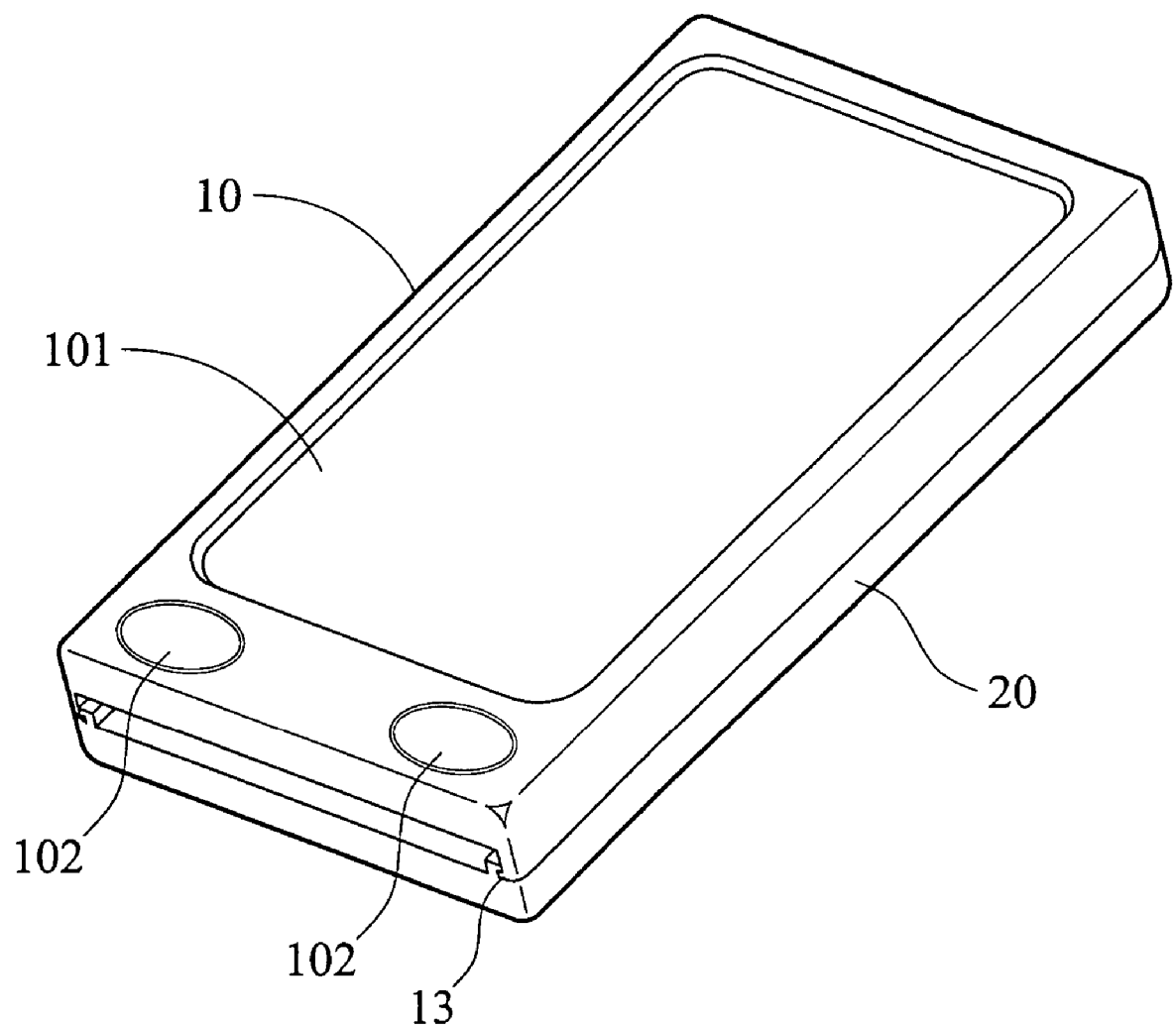
FIG. 1 is a perspective view of a closed mobile phone of embodiments of the invention.
Figure 2:
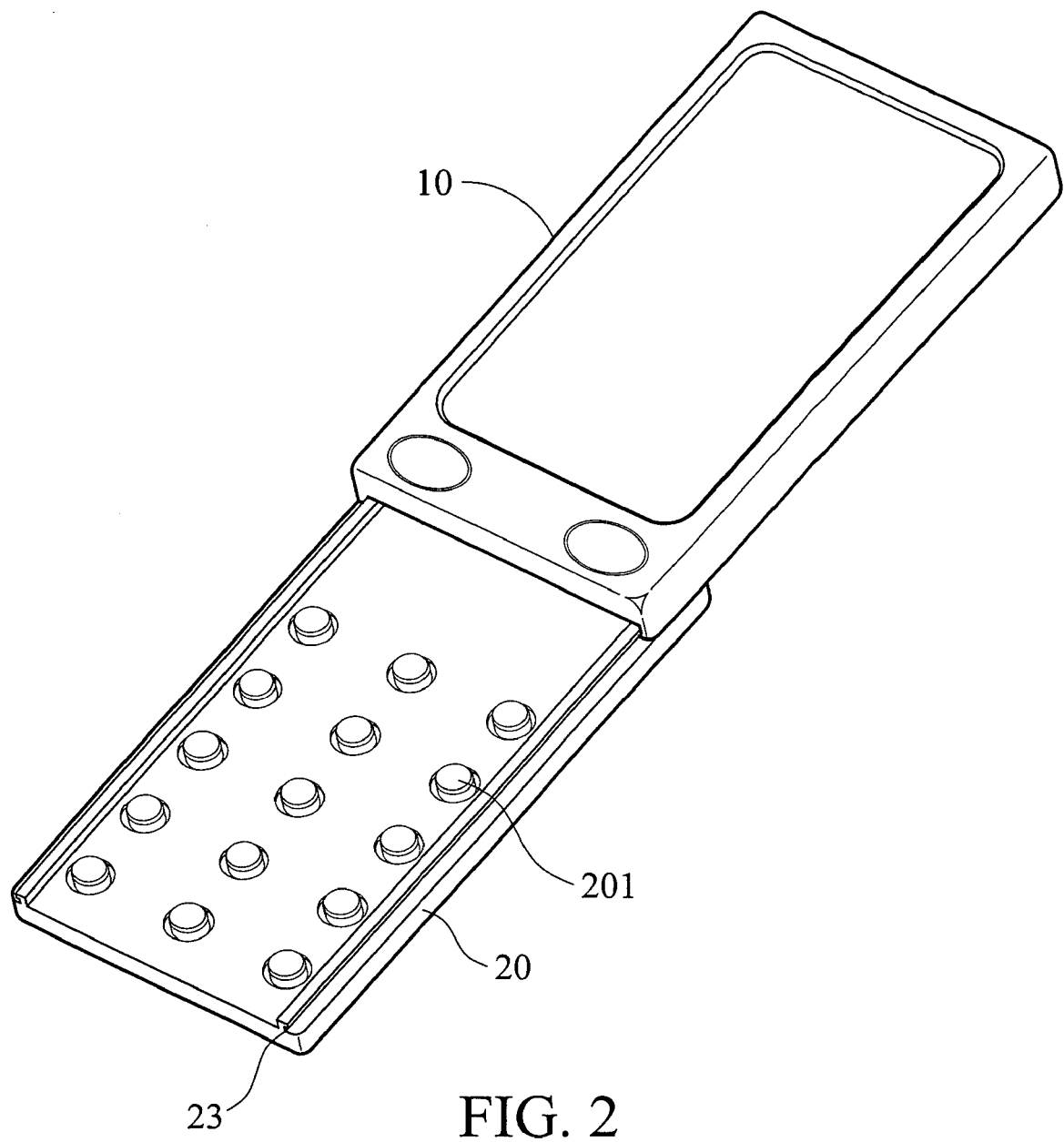
FIG. 2 is a perspective view of an open mobile phone of embodiments of the invention.

Referring to FIGS. 1 and 2, a mobile phone of this embodiment comprises an upper housing (described as a second housing in claims) 10 and a lower housing (described as a first housing in claims) 20. In this embodiment, the rectangular upper housing 10 is slidably disposed on the rectangular lower housing 20. A display 101 and a plurality of function keys 102 (two in this embodiment) is disposed on the front of the upper housing 10. A flange 13 is formed at the edge of the upper housing 10, seating in a groove 23 on the edge of the lower housing 20 to guide sliding motion. A plurality of keys 201 is disposed on the front (described as a first housing plane in claims) of the lower housing 20. The housings 10 and 20 slide apart to reveal the keys 201 when using the mobile phone.

The upper housing 10 must be retracted to expose keyspad 201 during use. In this embodiment, position holders are disposed on the upper and lower bodies 10, 20 to prevent unwanted sliding.

Figure 3:
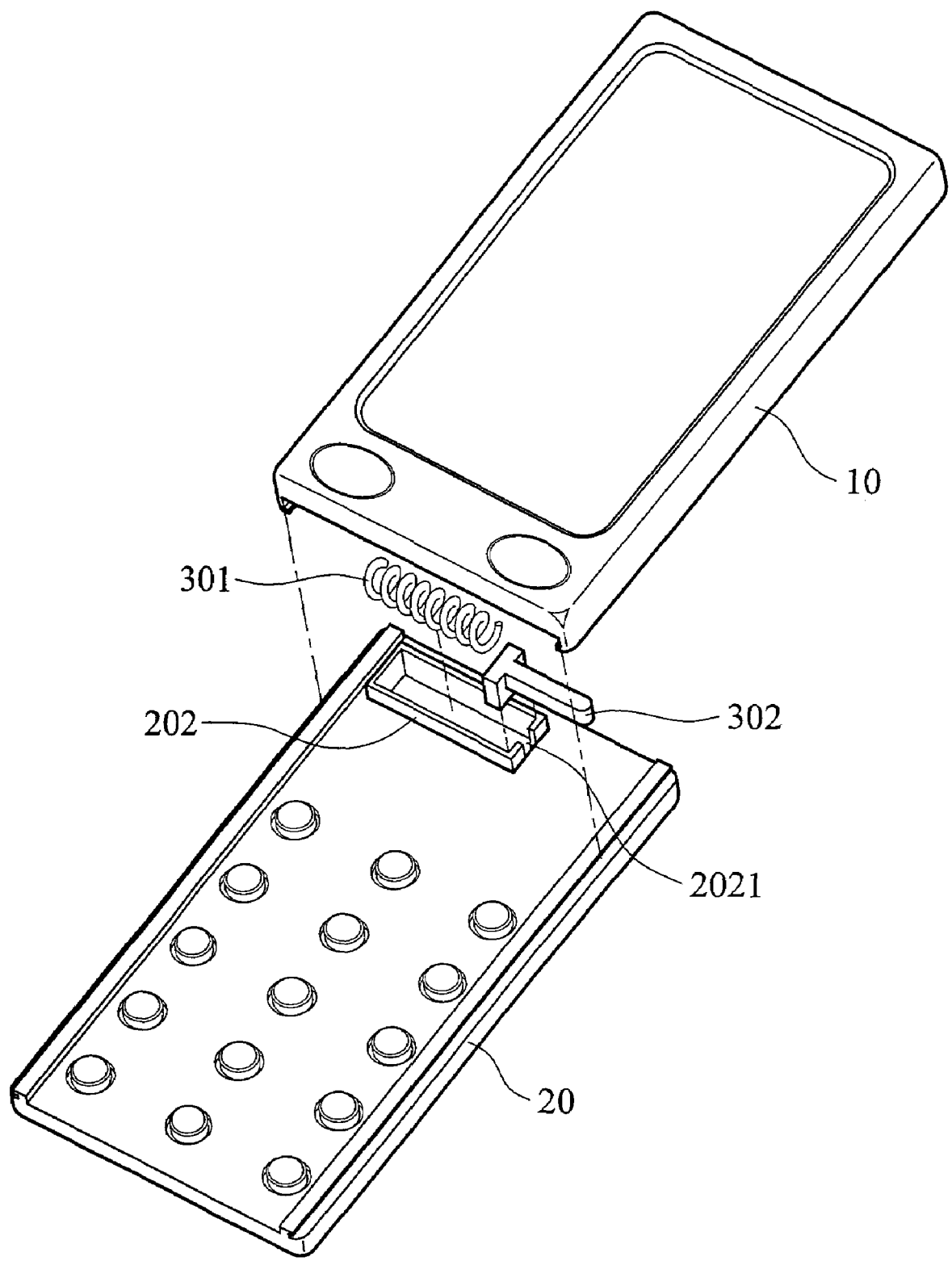
FIG. 3 is an exploded view of a mobile phone of the first embodiment of the invention.
Figure 4A:
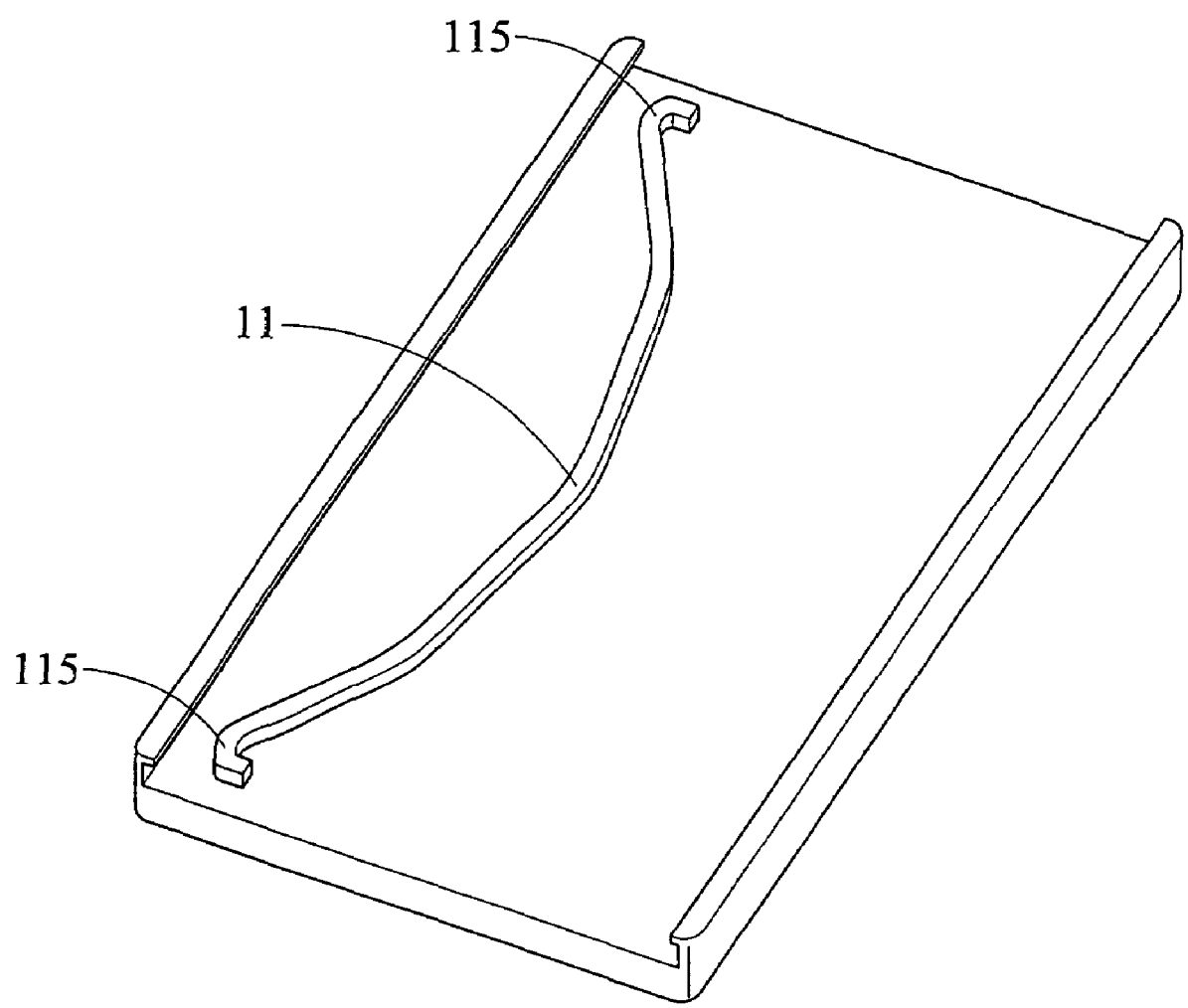
FIG. 4a is a perspective view of an upper housing of a mobile phone of the first embodiment of the invention.
Figure 4B:
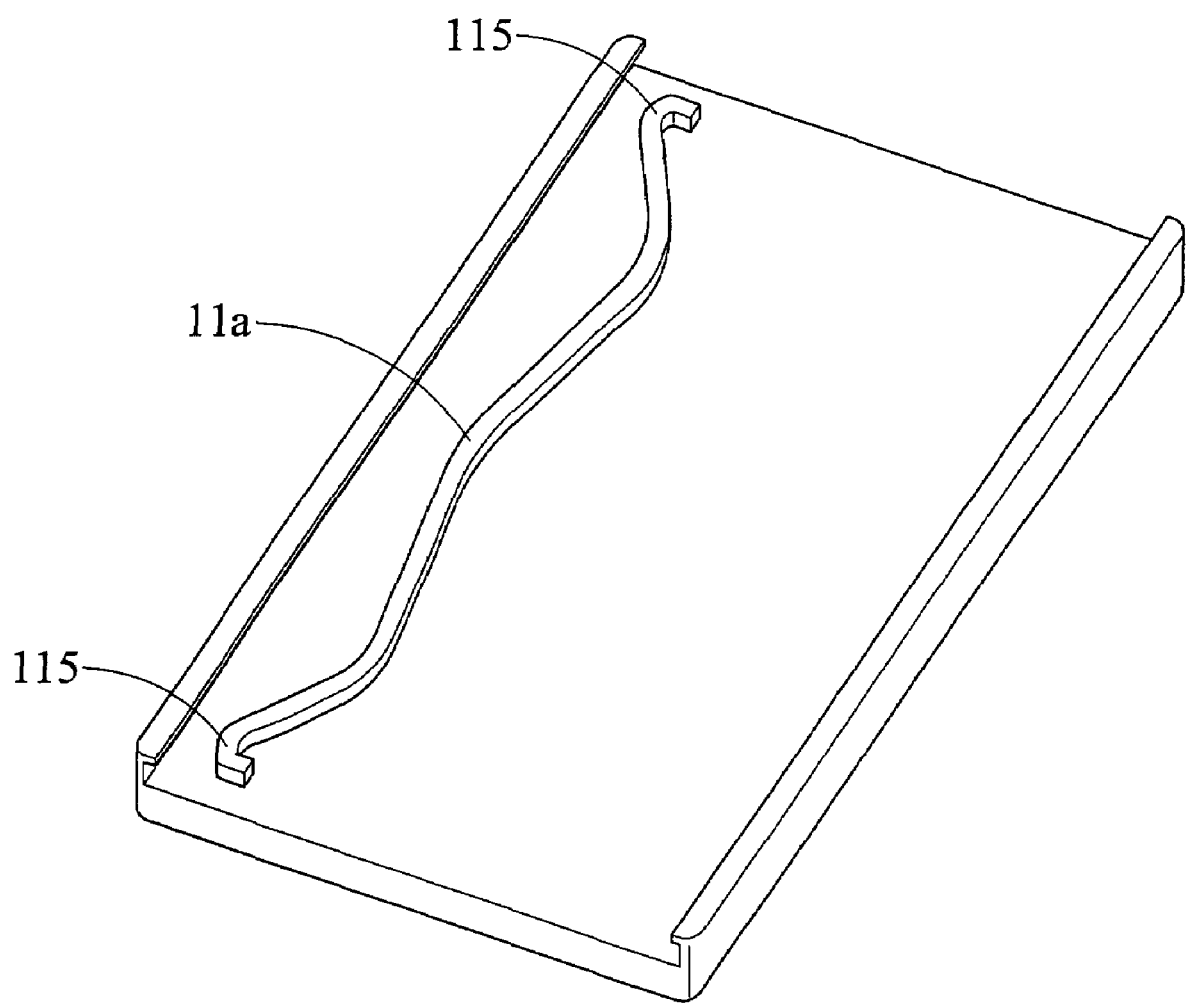
FIG. 4b is a perspective view of an alternative upper housing of a mobile phone of the first embodiment of the invention.
Figure 5:
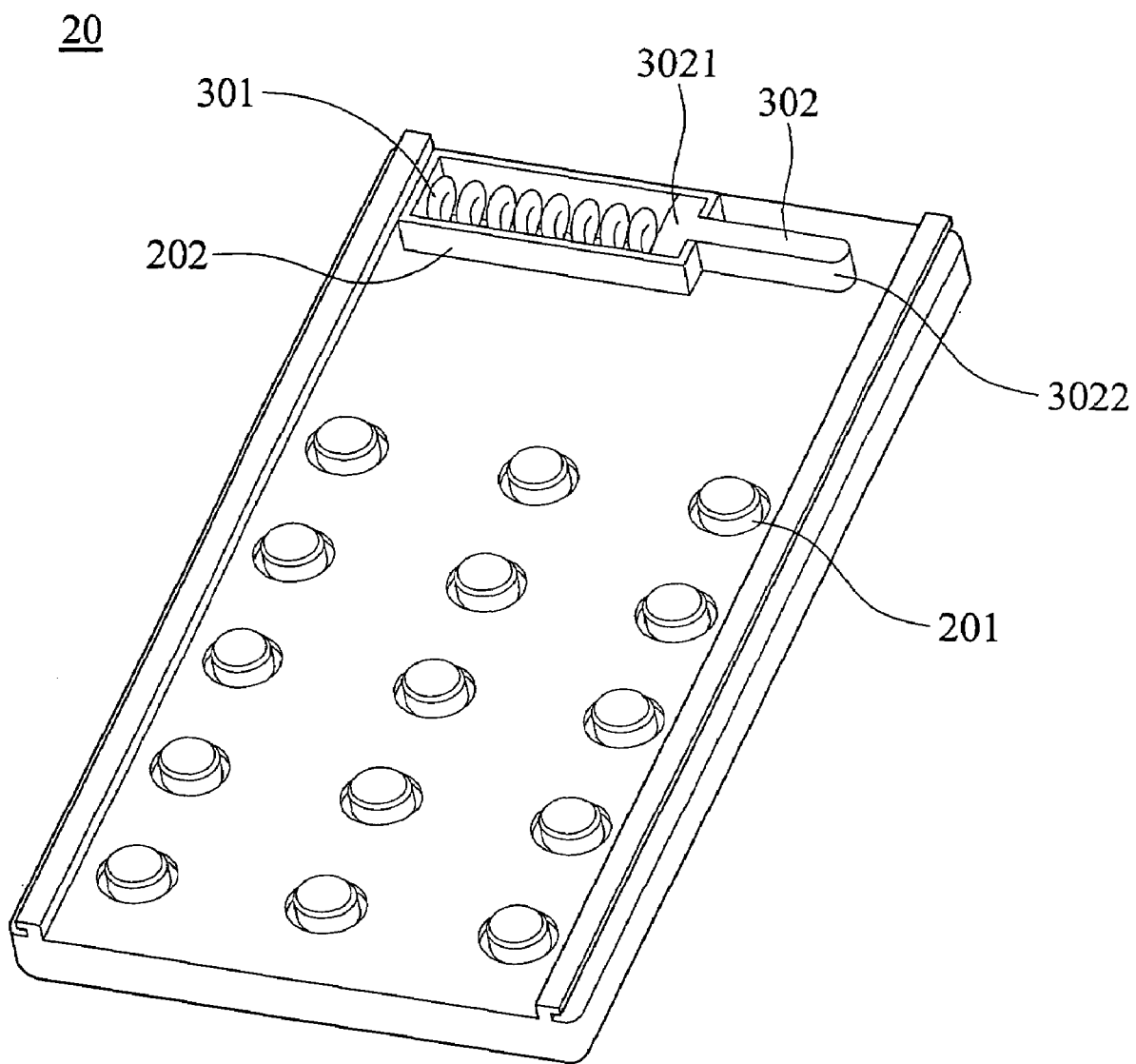
FIG. 5 is a perspective view of a lower housing of a mobile phone of the first embodiment of the invention.

FIG. 3 is an exploded view of the embodiment. The upper housing 10 has a track 11 fixed on the back (described as a second housing plane) as shown in FIG. 4a, and the lower housing 20 has a slot 202 provided with a flange. A compression spring 301 and a cam element 302 (shown in FIG. 5) are accommodated in the slot 202. The cam element 302 has a base portion 3021 sliding in the slot 202 and contacting the compression spring 301. The cam element 302 further has a finger 3022 extending through a notch 2021 formed on the flange of the slot 202 to abut the sliding track 11 when the upper housing 10 slides on the lower housing 20. The base portion 3021 and the finger 3022 are integrally formed and configured in a T shape. The compression spring 301 biases the base portion 3021 to ensure the finger 3022 abuts the track 11.

In the embodiment, the track 11 has a curved portion opposite the biasing direction of the compression spring 301. A hooked end 115 of the track 11 stops the finger 3022, preventing the upper housing 10 from escaping therefrom when the upper housing 10 slides on the lower housing 20.

Figure 6A:
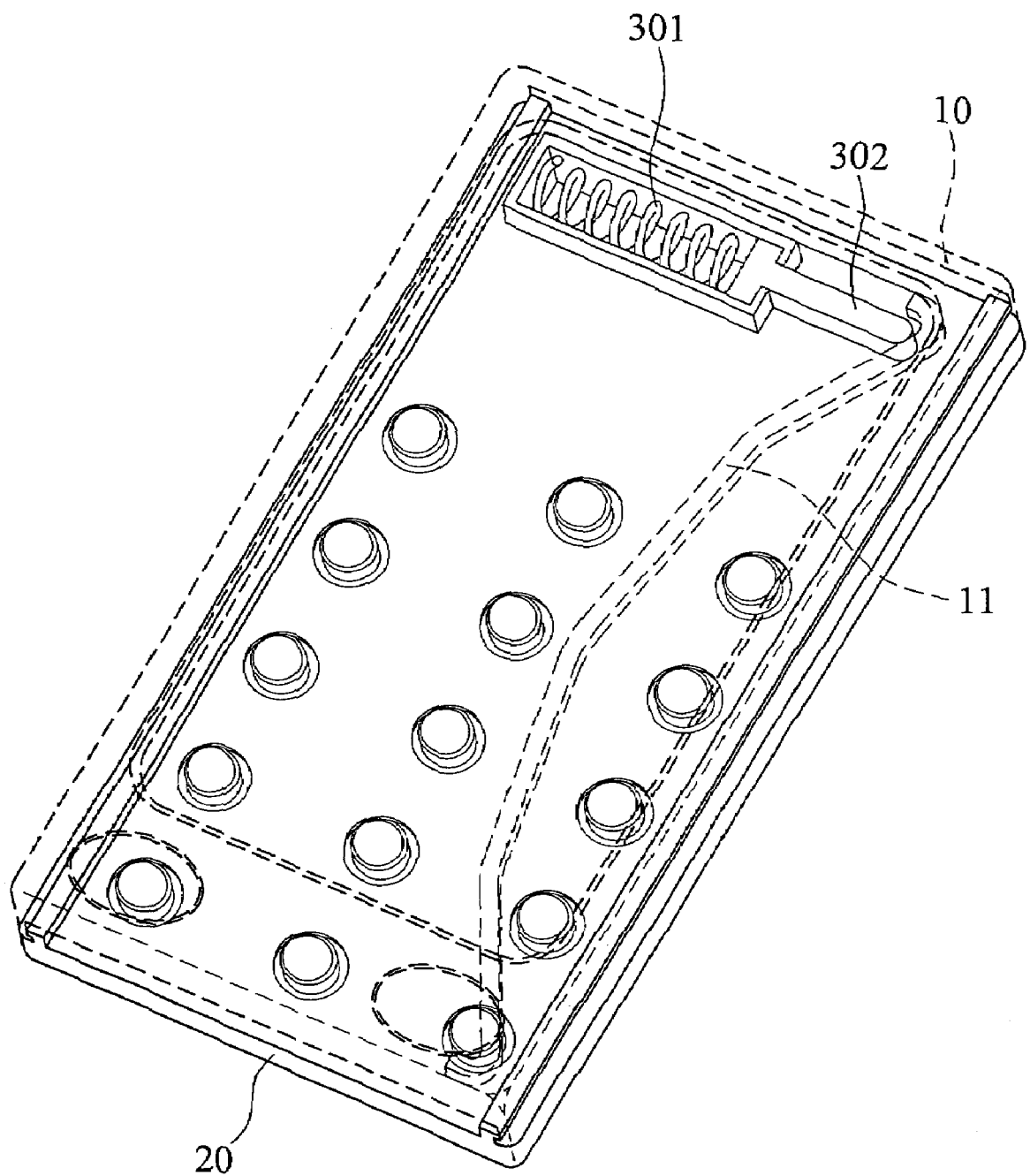
FIGS. 6a, 6b, 6c show the upper housing sliding on the lower housing in the first embodiment of the invention.
Figure 6B:
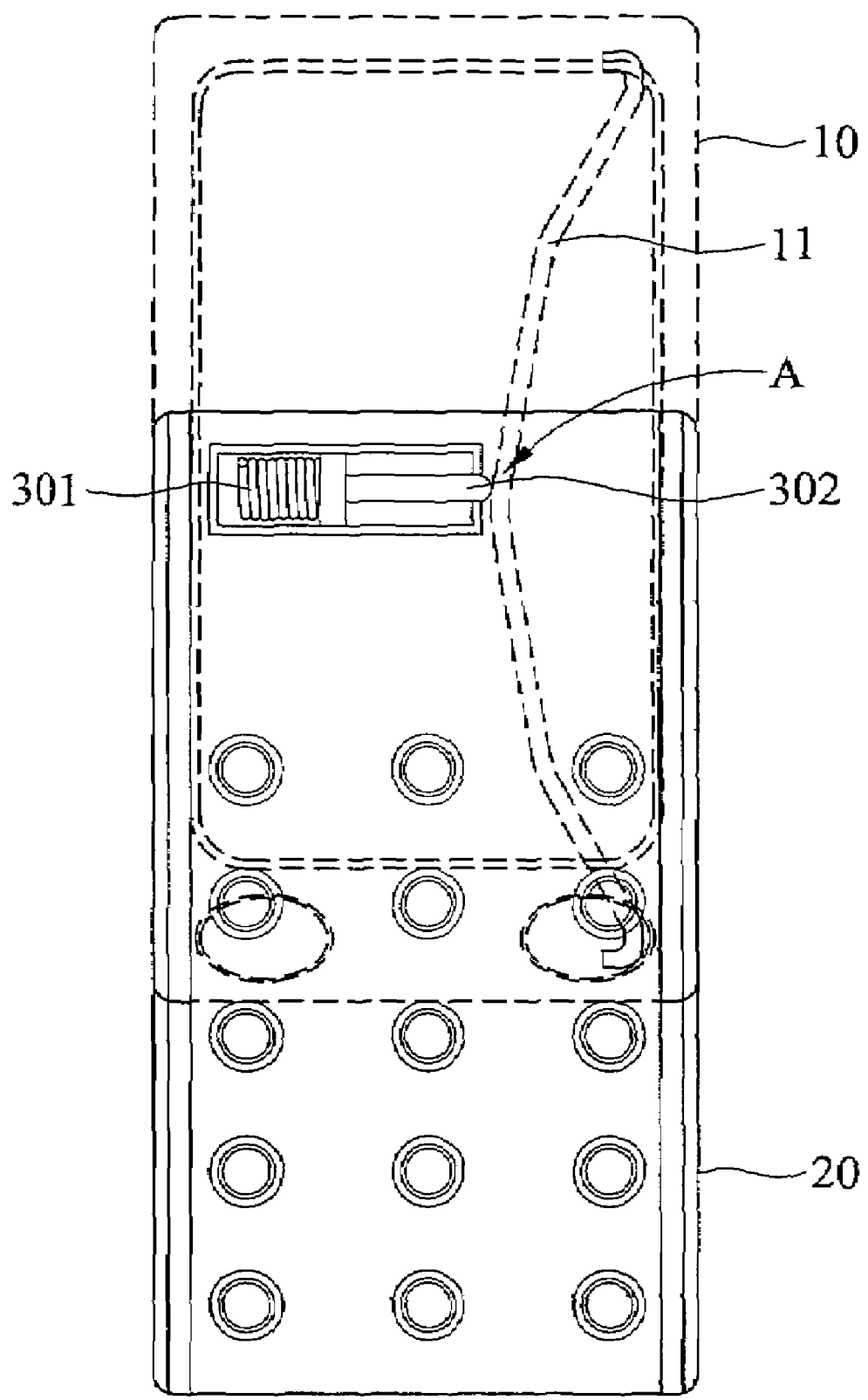
Figure 6C:
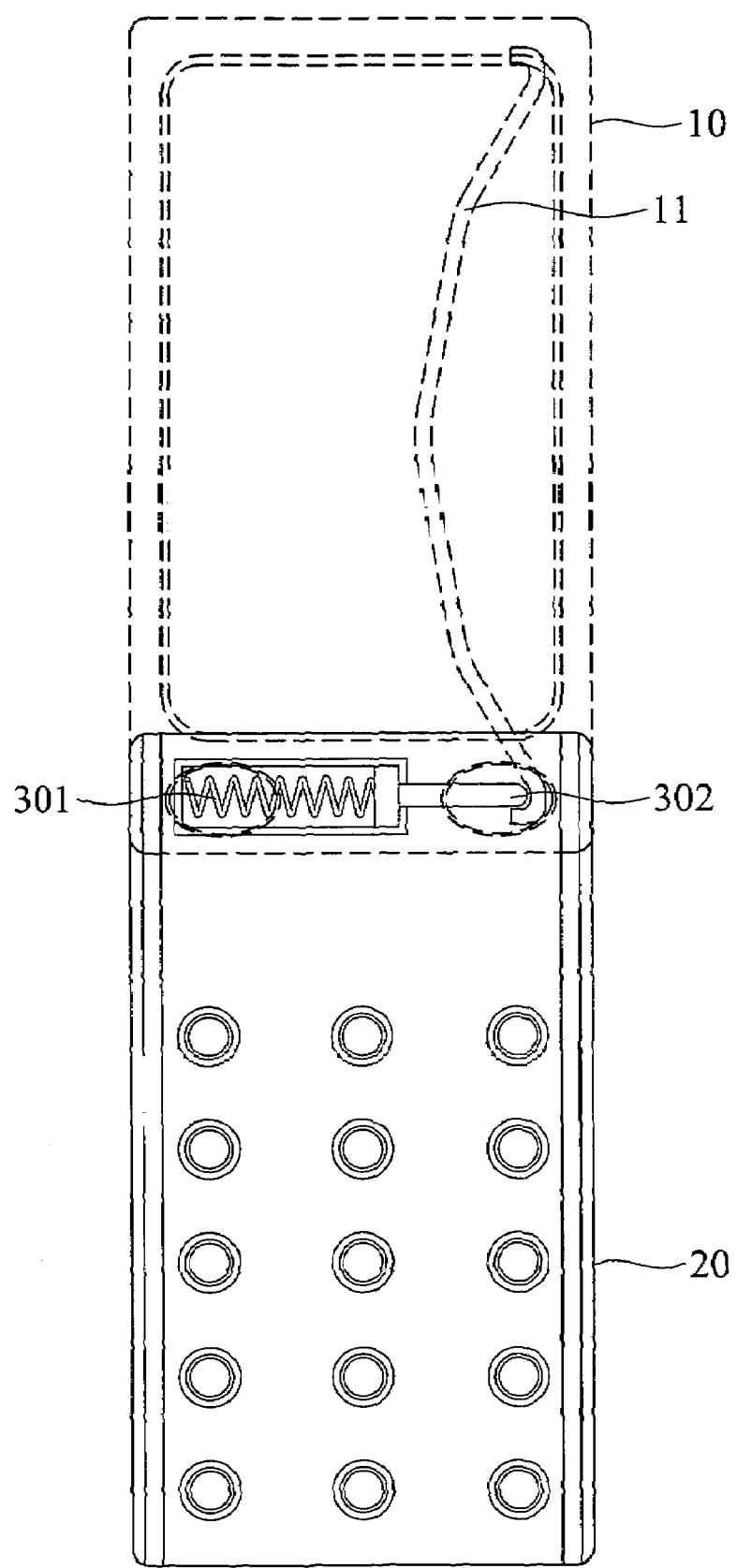

FIGS. 6a, 6b and 6c show the upper housing 10 sliding on the lower housing 20 in the embodiment. The sliding motion between the cam element 302 and the track 11 is shown in these FIGS, and the upper housing 10 is shown in a dashed line for clarity. In FIG. 6a, when the upper housing 10 slides from an initial position (the mobile phone is in a close state), the track 11 pushes the cam element 320 (finger 3022) to compress the compression spring 301. As shown in FIG. 6b, when the track 11 contacts the finger 3022 at a critical point A, the compression spring 301 is fully compressed. When the track 11 passes critical point A, the compression spring 301 is gradually released, allowing the upper housing 10 to easily slide to a terminal position (the mobile phone is open) as shown in FIG. 6c.

In addition, as shown in FIG. 4a, the track 11a can have a plurality of curved portions providing several stop positions for the upper housing 10. Thereby, the mobile phone is provided with multiple operating configurations.

Second Embodiment

Figure 7A:
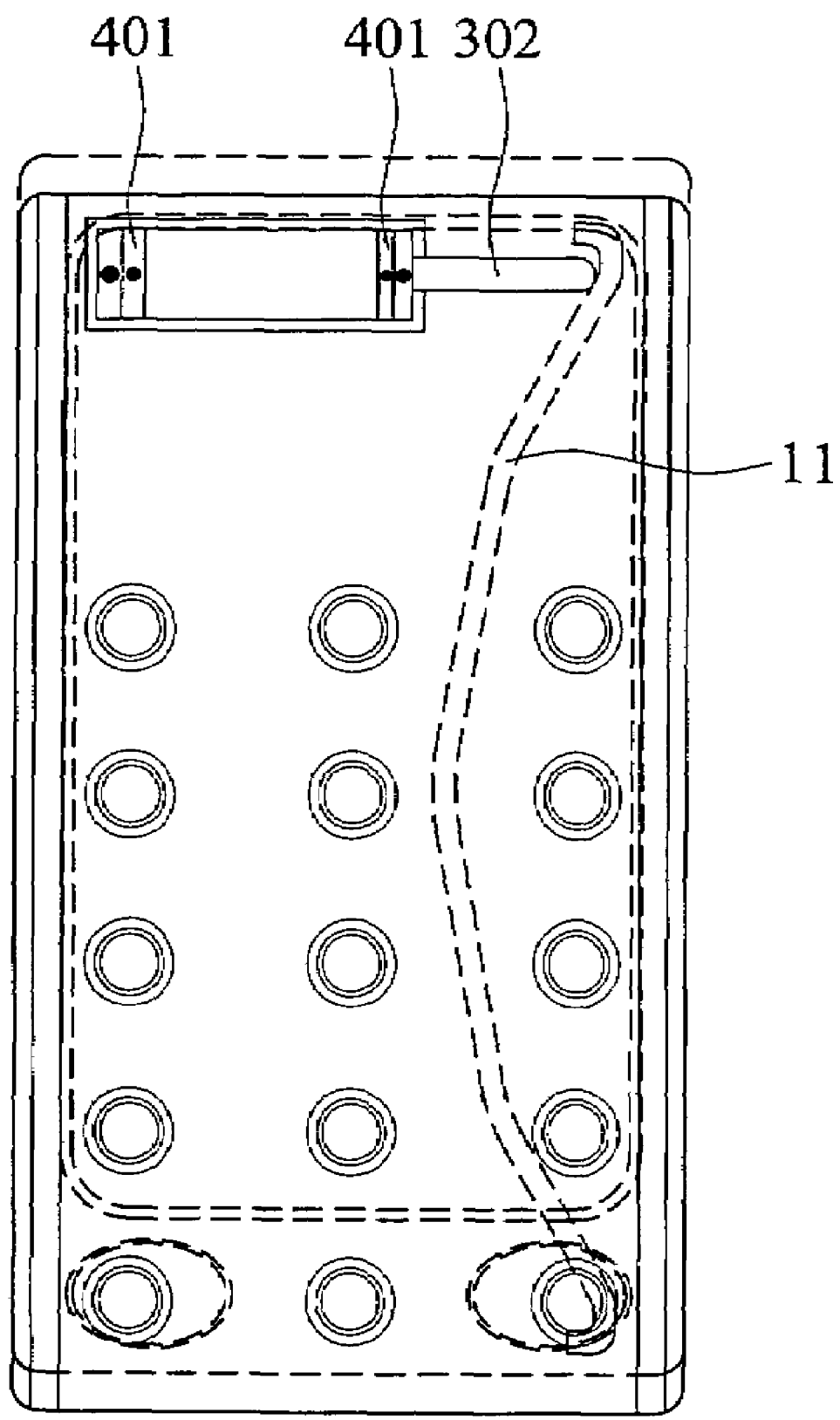
FIGS. 7a, 7b, 7c show the upper housing sliding on the lower housing in the second embodiment of the invention.
Figure 7B:
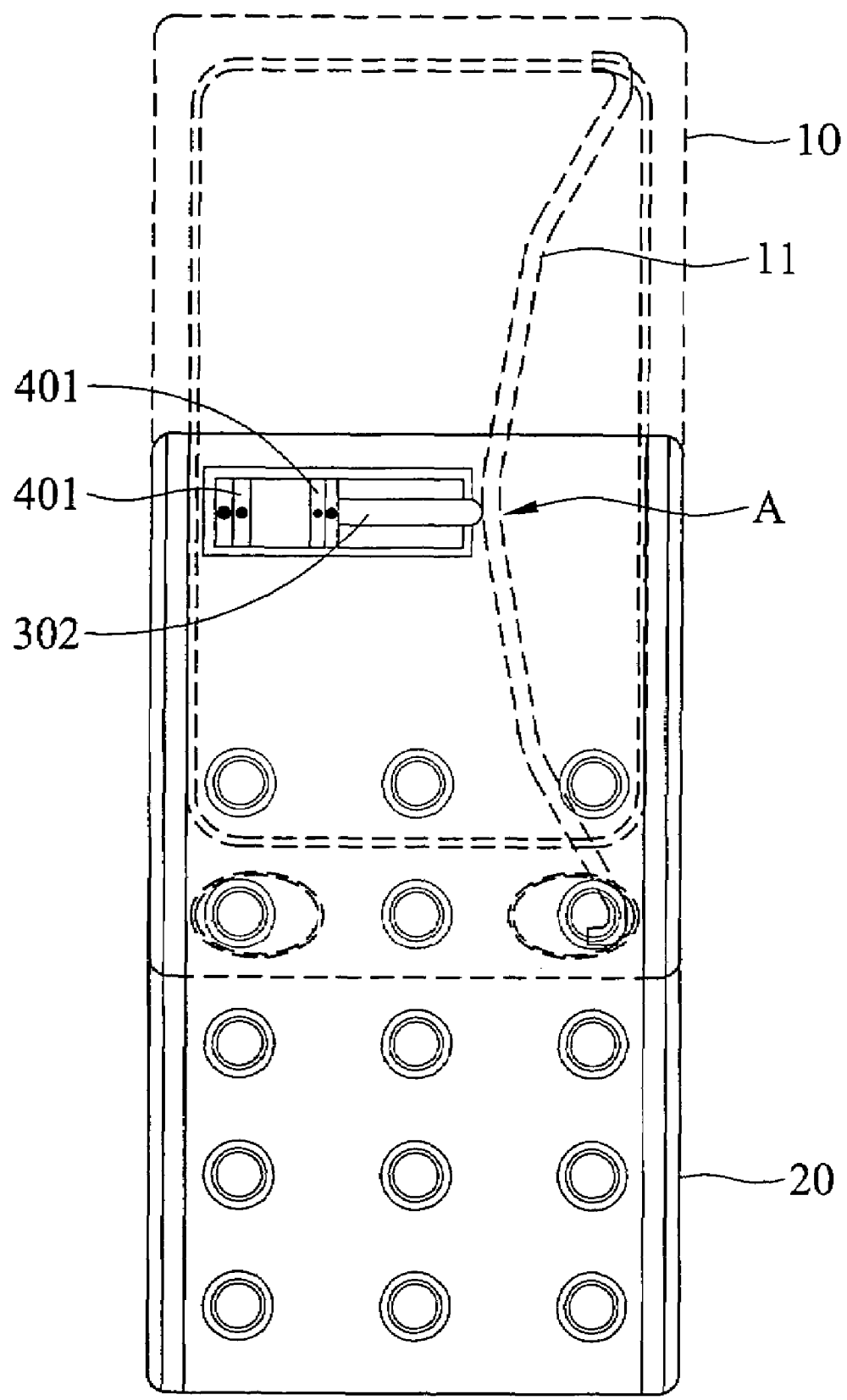
Figure 7C:
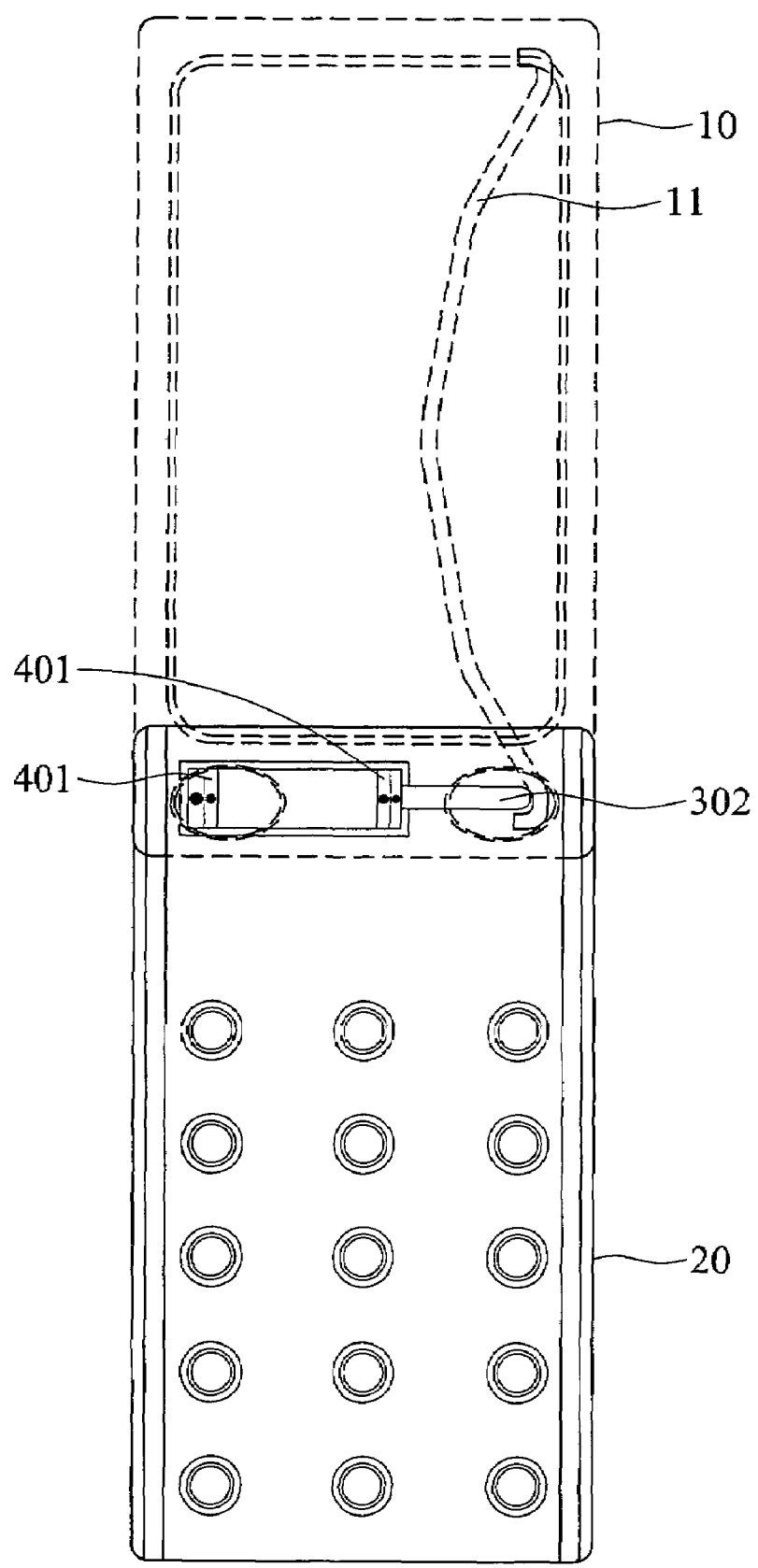

In this embodiment, referring to FIGS. 7a, 7b and 7c, the compression spring 301 of the first embodiment is replaced by two magnets 401, with other structures the same as the first embodiment. only the function of the two magnets is described here, with description of other elements omitted.

In this embodiment, one of the magnets 401 is fixed on the cam element 302 (base portion 3021), and the other fixed on the wall of the slot 202 opposite the base portion 3021. Like poles of the magnets are correspondingly disposed to exert repellent force on the cam element 302 to abut the track 11.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile phone, comprising:
   a first housing;
   a second housing sliding on the first housing;
   a track disposed on the second housing and protruding from the second housing, of a specific shape; and
   a cam element disposed on the first housing;
   wherein when the second housing slides on the first housing, the cam element abuts the track to fix at least one position thereof.

2. The mobile phone as claimed in claim 1, wherein the first housing comprises a plane on which the cam element is disposed, with the second housing also comprising a plane facing the first housing plane, on which the track is fixed.

3. The mobile phone as claimed in claim 1 further comprising a bias element disposed on the first housing plane to impel the cam element to abut the track.

4. The mobile phone as claimed in claim 3, wherein the bias element is a compression spring.

5. The mobile phone as claimed in claim 3, wherein the bias element comprises two magnets positioned with the same polarity, one fixed on the cam element and the other on the first housing, wherein repellent force between the magnets impels the cam element to abut the track.

6. A mobile phone comprising:
   a first housing;
   a second housing sliding on the first housing;
   a track disposed on the second housing of a specific shape;
   a cam element disposed on the first housing; and
   a bias element disposed on the first housing plane to impel the cam element to abut the track;
   wherein the track comprises at least one curved portion in a first direction parallel to the second housing plane and opposite the bias of the bias element.

7. The mobile phone as claimed in claim 6, wherein the track comprises hooked ends preventing the cam element from escaping the track.

8. The mobile phone as claimed in claim 3, wherein the first housing further has a slot formed on the first housing plane to accommodate the cam element and the bias element.

9. The mobile phone as claimed in claim 8, wherein the cam element comprises a finger abutting the track and a base portion sliding in the slot and contacting the bias element.

10. The mobile phone as claimed in claim 9, wherein the finger and the base portion are integrally formed and configured in a T shape.

11. The mobile phone as claimed in claim 9, the slot comprising a flange on which a notch is defined through which the finger extends to abut the track.

12. The mobile phone as claimed in claim 2, the first housing comprising a groove and the second housing a flange seating in the groove.

* * * * *